US012671345B2

(12) United States Patent
Taga

(10) Patent No.: US 12,671,345 B2
(45) Date of Patent: Jun. 30, 2026

(54) RECTIFYING CIRCUIT AND ELECTRIC POWER SOURCE CIRCUIT

(71) Applicant: Asahi Kasei Microdevices Corporation, Tokyo (JP)

(72) Inventor: Shiro Taga, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 222 days.

(21) Appl. No.: 18/424,862

(22) Filed: Jan. 28, 2024

(65) Prior Publication Data

US 2024/0322706 A1     Sep. 26, 2024

(30) Foreign Application Priority Data

Mar. 23, 2023     (JP) ................................. 2023-047113

(51) Int. Cl.
*H02M 7/219*          (2006.01)
(52) U.S. Cl.
CPC ......... *H02M 7/2195* (2021.05); *H02M 7/219* (2013.01)
(58) Field of Classification Search
CPC ..... H02M 7/217; H02M 7/219; H02M 7/2195
See application file for complete search history.

(56) References Cited

U.S. PATENT DOCUMENTS 5,890,031 A     3/1999  Yokota
10,256,742 B2 *  4/2019  Hui ......................... H02M 7/06

| | | | |
|---|---|---|---|
| 2012/0314456 A1* | 12/2012 | Lanni ................... | H02M 1/4258 |
| | | | 363/21.02 |
| 2014/0227983 A1 | 8/2014 | Clausen | |
| 2015/0002081 A1* | 1/2015 | Lohr ..................... | H02M 7/219 |
| | | | 320/107 |
| 2015/0280606 A1* | 10/2015 | Yoshida ................ | H02M 7/103 |
| | | | 363/127 |
| 2016/0043657 A1* | 2/2016 | Mauder .................. | H02M 1/36 |
| | | | 363/127 |
| 2018/0069486 A1 | 3/2018 | Ouda | |
| 2018/0191267 A1 | 7/2018 | Keikhosravy | |
| 2018/0287508 A1* | 10/2018 | Nakamura ............. | H02M 7/217 |

(Continued)

FOREIGN PATENT DOCUMENTS

JP          2008011584 A     1/2008

OTHER PUBLICATIONS

Koji Kotani et al., "High-Efficiency Differential-Drive CMOS Rectifier for UHF RFIDs" IEEE Journal of Solid-State Circuits, vol. 44, No. 11 pp. 3011-3018, Nov. 2009.

*Primary Examiner* — Gustavo A Rosario-Benitez

(57)          ABSTRACT

Provided is a rectifying circuit comprising: a first connection portion which couples drain terminals of a first transistor and a second transistor; a first bias unit which biases an alternating current voltage component of alternating current electric power according to magnitude of amplitude of the alternating current voltage component and inputs the alternating current voltage component, which has been biased, to a gate terminal of the first transistor; and a second bias unit which biases the alternating current voltage component of the alternating current electric power inputted to according to the magnitude of the amplitude of the alternating current voltage component and inputs the alternating current voltage component, which has been biased, to a gate terminal of the second transistor.

19 Claims, 10 Drawing Sheets

300

(56) References Cited

U.S. PATENT DOCUMENTS

| | | | | |
|---|---|---|---|---|
| 2021/0391804 A1* | 12/2021 | Salama | .................. | H02M 1/08 |
| 2022/0021241 A1* | 1/2022 | Guedon | .............. | H03K 17/302 |
| 2022/0021300 A1* | 1/2022 | Wang | ................. | H02M 7/2195 |

* cited by examiner

RECTIFYING CIRCUIT AND ELECTRIC POWER SOURCE CIRCUIT

The contents of the following patent application(s) are incorporated herein by reference:

NO. 2023-047113 filed in JP on Mar. 23, 2023

BACKGROUND

1. Technical Field

The present invention relates to a rectifying circuit and an electric power source circuit.

2. Related Art

There has been a conventional rectifying circuit known which rectifies input electric power (see Patent Documents 1 and 2, and Non-Patent Document 1, for example).

Patent Document 1: U.S. Pat. No. 5,890,031

Patent Document 2: Japanese Patent Application Publication No. 2008-011584

Non-Patent Document 1: Koji Kotani, et al, "High-Efficiency Differential Drive CMOS Rectifier for UHF RFIDs" IEEE J. Solid-State Circuits, vol. 44, no. 11 pp. 3011-318 November 2009.

DESCRIPTION OF EXEMPLARY EMBODIMENTS

Figure 1:
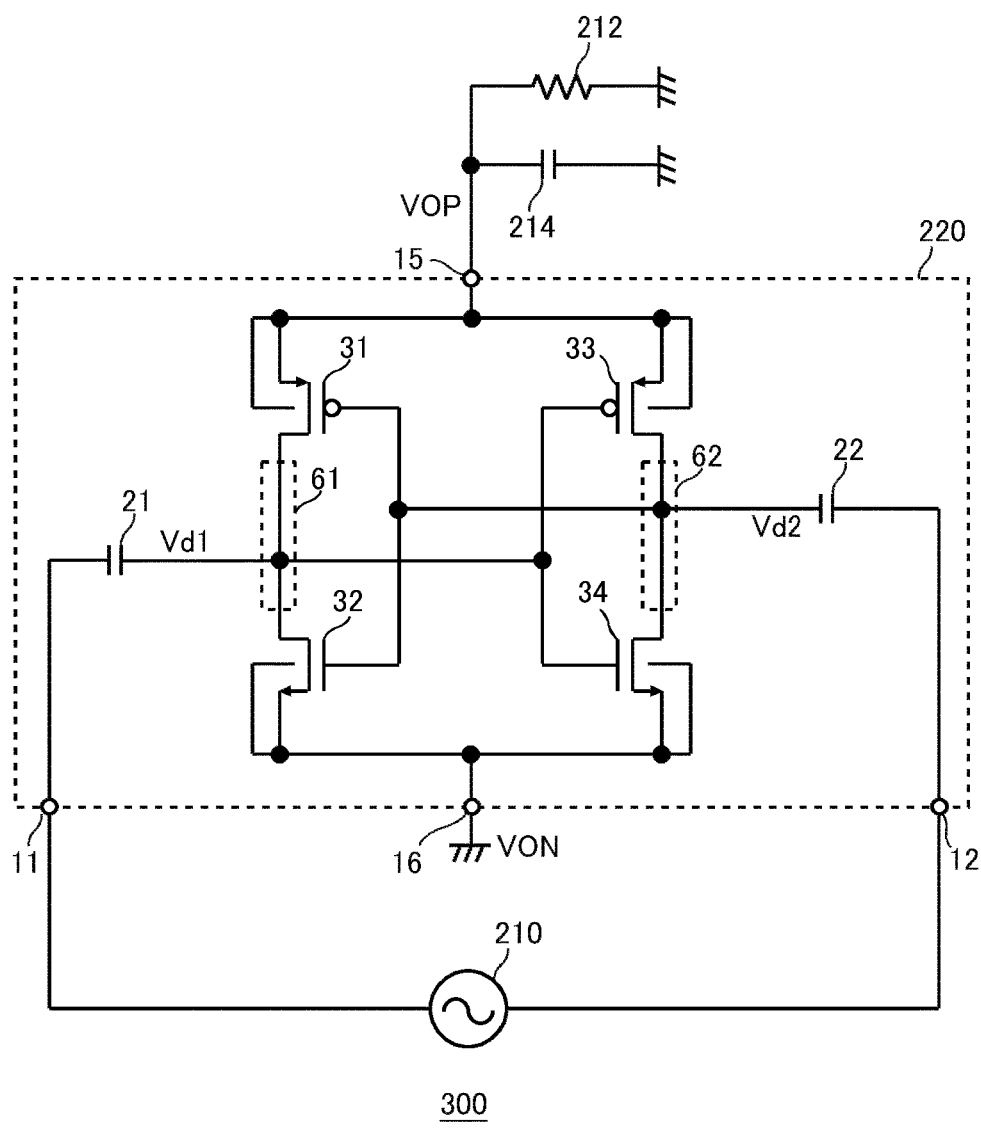
FIG. 1 shows an electric power source circuit 300 according to a first reference example.

Hereinafter, the present invention will be described through embodiments of the invention, but the following embodiments do not limit the invention according to claims. In addition, not all combinations of features described in the embodiments are essential to a solution of the invention. In the present specification, the same parts in each figure are marked with the same reference numerals, and their description may be omitted. In addition, some configurations may not be illustrated for illustration purpose.

In the present specification, a case where a term such as "same" or "equal" is mentioned may also include a case where there is an error due to a variation in manufacturing or the like. The error is, for example, within 10%. In addition, each terminal and a component in the figure may be coupled by using a wiring line or the like. Each ground terminal in the figure may be a common terminal, or may be a different terminal. In describing a circuit diagram, when it is stated that a specific component is provided between two other components, the statement describes a positional relationship between these components on an electric path, and does not limit spatial arrangement of these components.

There is a rectifying circuit known which extracts direct current electric power from alternating current electric power. Preferably, the rectifying circuit can perform alternating current/direct current conversion with high efficiency over a wide electric power range. For example, a rectifying circuit may be used to receive alternating current electric power of microwave with several hundreds of MHz or more with an antenna and to extract direct current electric power. Such a technique is used, for example, for: energy harvesting for extracting a small amount of electric power from electromagnetic waves for communication with an IC chip with an antenna or from environmental electromagnetic waves such as wireless LAN electromagnetic waves; or space transmission type wireless power transmission for transmitting electric power by using microwaves to various sensors or display apparatuses.

Electric power of electromagnetic waves including microwaves is attenuated by the square of a distance from an electric power transmission antenna according to the Friis transmission formula. Therefore, magnitude of electric power obtained from an electric power reception antenna greatly changes depending on the distance from the electric power transmission antenna. Accordingly, it is preferable that a rectifying circuit used for such a use application can extract direct current electric power from weak electric power and also can perform alternating current/direct current conversion with high efficiency over a wide electric power range.

FIG. 1 shows an electric power source circuit 300 according to a first reference example. The electric power source circuit 300 includes an electric power source 210 and a rectifying circuit 220, and supplies direct current electric power to a load. In FIG. 1, the load is shown as a resistor 212. A smoothing capacitor 214 may be provided in parallel with the resistor 212 as the load.

The electric power source 210 generates alternating current electric power. The electric power source 210 may include an antenna which receives electromagnetic waves to generate alternating current electric power. The electromagnetic waves may be electromagnetic waves transmitted toward the electric power source 210, or may be environmental electromagnetic waves which are not directed to the electric power source 210 but are present in a surrounding environment. The electric power source 210 may receive microwaves (for example 100 MHz or more) to generate alternating current electric power. The electric power source 210 may generate alternating current electric power by another method. The electric power source 210 may be an energy harvesting electric power source which performs energy harvesting such as solar power generation, thermal power generation, or vibration power generation, or may be an electric power source other than an energy harvesting electric power source.

The rectifying circuit 220 converts the alternating current electric power from the electric power source 210 to direct current electric power. The rectifying circuit 220 is a full-wave rectifying circuit with a differential configuration. The rectifying circuit 220 includes a CMOS transistor.

The rectifying circuit 220 includes a first input terminal 11, a second input terminal 12, a high voltage side output terminal 15, and a low voltage side output terminal 16. Alternating current electric power having mutually opposite phases is inputted to the first input terminal 11 and the second input terminal 12. The first input terminal 11 and the second input terminal 12 are coupled to the electric power source 210.

The high voltage side output terminal 15 and the low voltage side output terminal 16 output direct current electric power obtained by rectifying the alternating current electric power. In the present example, the resistor 212 and the smoothing capacitor 214 are coupled in parallel to the high voltage side output terminal 15. The high voltage side output terminal 15 in the present example outputs a rectified and smoothed direct current voltage VOP. A voltage VON lower than the direct current voltage VOP is outputted from the low voltage side output terminal 16 in the present example. The low voltage side output terminal 16 may be coupled to a ground potential.

The rectifying circuit 220 in the present example has a first transistor 31, a second transistor 32, a third transistor 33, a fourth transistor 34, a first input capacitor 21, and a second input capacitor 22. Each of the transistors described in the present specification may be a MOS transistor.

The first transistor 31 is provided between the high voltage side output terminal 15 and the low voltage side output terminal 16. The second transistor 32 is provided between the first transistor 31 and the low voltage side output terminal 16. The second transistor 32 has a different channel type from that of the first transistor 31. The channel type refers to either an N channel or a P channel. In the example shown in FIG. 1, the first transistor 31 is a P channel MOSFET, and the second transistor 32 is an N channel MOSFET.

A source terminal of the first transistor 31 is coupled to the high voltage side output terminal 15, and a source terminal of the second transistor 32 is coupled to the low voltage side output terminal 16. Drain terminals of the first transistor 31 and the second transistor 32 are coupled to each other by a first connection portion 61. The first connection portion 61 is, for example, an electrical wiring line. In addition, gate terminals of the first transistor 31 and the second transistor 32 are coupled to each other.

A voltage Vd1 corresponding to the alternating current electric power inputted to the first input terminal 11 is applied to the first connection portion 61. In the present example, the first input capacitor 21 is provided between the first input terminal 11 and the first connection portion 61. The first input capacitor 21 applies, to the first connection portion 61, the voltage Vd1 that is of an alternating current voltage applied to the first input terminal 11 and that corresponds to an alternating current component.

A gate signal (a voltage Vd2 in the present example) corresponding to the alternating current electric power inputted to the second input terminal 12 is applied to the gate terminals of the first transistor 31 and the second transistor 32. In the present example, the second input capacitor 22 is provided between the second input terminal 12 and each gate terminal. The second input capacitor 22 applies, to each gate terminal, the voltage Vd2 that is of an alternating current voltage applied to the second input terminal 12 and that corresponds to an alternating current component.

The third transistor 33 is provided between the high voltage side output terminal 15 and the low voltage side output terminal 16. The fourth transistor 34 is provided between the third transistor 33 and the low voltage side output terminal 16. The fourth transistor 34 has a different channel type from that of the third transistor 33. The third transistor 33 has the same channel type as that of the first transistor 31. In the example shown in FIG. 1, the third transistor 33 is a P channel MOSFET, and the fourth transistor 34 is an N channel MOSFET.

A source terminal of the third transistor 33 is coupled to the high voltage side output terminal 15, and a source terminal of the fourth transistor 34 is coupled to the low voltage side output terminal 16. Drain terminals of the third transistor 33 and the fourth transistor 34 are coupled to each other by a second connection portion 62. The second connection portion 62 is, for example, an electrical wiring line. In addition, gate terminals of the third transistor 33 and the fourth transistor 34 are coupled to each other.

The voltage Vd2 corresponding to the alternating current electric power inputted to the second input terminal 12 is applied to the second connection portion 62. In the present example, the second input capacitor 22 is provided between the second input terminal 12 and the second connection portion 62. The second input capacitor 22 applies, to the second connection portion 62, the voltage Vd2 that is of the alternating current voltage applied to the second input terminal 12 and that corresponds to the alternating current component.

A gate signal (the voltage Vd1 in the present example) corresponding to the alternating current electric power inputted to the first input terminal 11 is applied to the gate terminals of the third transistor 33 and the fourth transistor 34. In the present example, the first input capacitor 21 is provided between the first input terminal 11 and each gate terminal. The first input capacitor 21 applies, to each gate terminal, the voltage Vd1 that is of the alternating current voltage applied to the first input terminal 11 and that corresponds to the alternating current component.

The third transistor 33 and the fourth transistor 34 operate in opposite phases to the first transistor 31 and the second transistor 32. The source terminals and bulks of the second transistor 32 and the fourth transistor 34 output the voltage VON, and the source terminals and bulks of the first transistor 31 and the third transistor 33 output the voltage VOP. In the present specification, among differential configurations of the rectifying circuit, an operation of one differential configuration may be described, and a description of an operation of another differential configuration may be omitted. In an integrated circuit mounted on a p type silicon wafer, a bulk of a PMOS transistor is an n type well in which a PMOS is formed, and a bulk of an NMOS transistor is a p type well formed in a deep n well in which an NMOS is formed.

Figure 2:
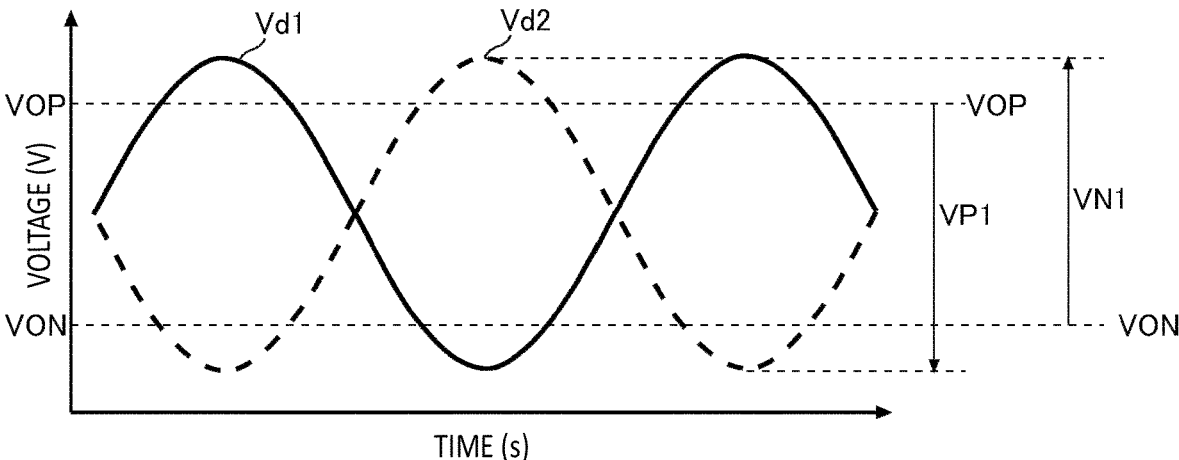
FIG. 2 shows an example of a voltage applied between a gate and a source of each transistor.

FIG. 2 shows an example of a voltage applied between a gate and a source of each transistor. In FIG. 2, gate-source voltages of the first transistor 31 and the second transistor 32 are described, and a description of gate-source voltages of the third transistor 33 and the fourth transistor 34 is omitted.

The voltage Vd1 of a sine wave is inputted to the drain terminals of the first transistor 31 and the second transistor 32, and the voltage Vd2 obtained by inverting the voltage Vd1 is inputted to the gate terminals. A positive voltage between the gate and the source of the second transistor 32 is defined as VN1, and a negative voltage between the gate and the source of the first transistor 31 is defined as VP1. Since a source voltage of the second transistor 32 is VON, the voltage VN1 is a voltage of the voltage Vd2 with the voltage VON as a reference. Since a source voltage of the first transistor 31 is VOP, the voltage VP1 is a voltage of the voltage Vd2 with the voltage VOP as a reference. FIG. 2 shows peak values of the voltage VN1 and the voltage VP1.

Figure 3:
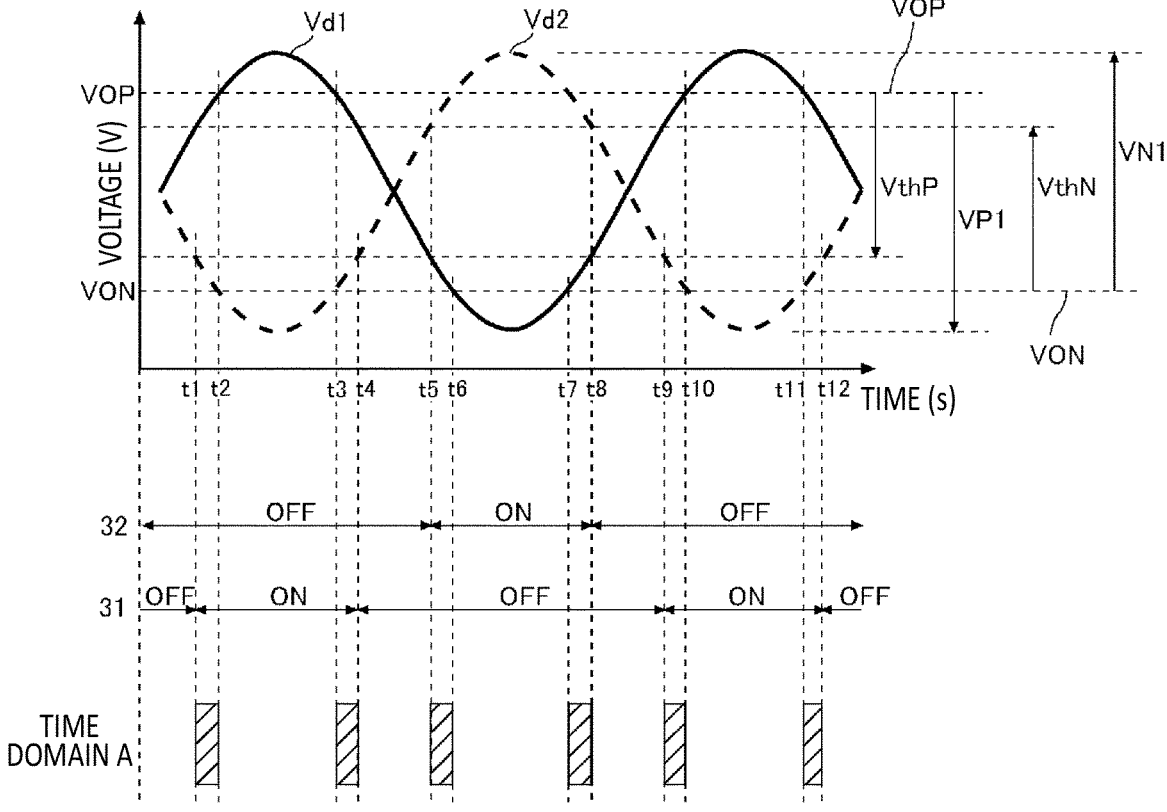
FIG. 3 illustrates an operation example of a rectifying circuit 220 in FIG. 1 for when voltages Vd1 and Vd2 having relatively small amplitude are inputted.

FIG. 3 illustrates an operation example of the rectifying circuit 220 in FIG. 1 for when voltages Vd1 and Vd2 having relatively small amplitude are inputted. In FIG. 3, operations of the first transistor 31 and the second transistor 32 are described, and a description of operations of the third transistor 33 and the fourth transistor 34 is omitted.

A threshold voltage of the first transistor 31 is defined as VthP, and a threshold voltage of the second transistor 32 is defined as VthN. As in a time period t5 to t8 in FIG. 3, when the voltage VN1 between the gate and the source of the second transistor 32 exceeds the threshold voltage VthN, the second transistor 32 is turned on. In the time period, if the voltage Vd1 is smaller than the voltage VON, the voltage VON decreases as a result of the second transistor 32 being turned on. As in time periods t1 to t4 and t9 to t12 in FIG. 3, when the voltage VP1 between the gate and the source of the first transistor 31 exceeds the threshold voltage VthP, the first transistor 31 is turned on. In the time period, if the voltage Vd1 is greater than the voltage VOP, the voltage VOP increases as a result of the first transistor 31 being turned on. In this manner, a rectifying operation is performed by switching the first transistor 31 and the second transistor 32.

In the present example, a minimum value of amplitude of the voltage Vd1 (0 V to a peak voltage) which can be rectified is half the threshold voltage of each transistor. In addition, in the rectifying circuit in the present example, there is no voltage drop caused by a forward voltage of a diode as compared to a rectifying circuit using a diode, and thus even the voltage Vd1 having small amplitude can be efficiently rectified.

When the amplitude of the voltage Vd1 increases, a peak value of the voltage VN1 may become greater than the threshold voltage VthN, or a peak value of the voltage VP1 may become smaller (greater in terms of an absolute value) than the threshold voltage VthP. In this case, an electric current may flow backward from the low voltage side output terminal 16 or the high voltage side output terminal 15 to the first connection portion 61, and electric power supply to the load may be interrupted.

For example, in the time period t1 to t4 during which the first transistor 31 is on, the voltage VOP of the high voltage side output terminal 15 is greater than the voltage Vd1 of the first connection portion 61 in a time period t1 to t2 and a time period t3 to t4. In these time periods, the electric current flows backward from the high voltage side output terminal 15 to the first connection portion 61. The same applies to a time period t9 to t10 and a time period t11 to t12.

In the time period t5 to t8 during which the second transistor 32 is on, the voltage VON of the low voltage side output terminal 16 is lower than the voltage Vd1 of the first connection portion 61 in a time period t5 to t6 and a time period t7 to t8. In these time periods, the electric current flows backward from the first connection portion 61 to the low voltage side output terminal 16. In the present specification, a time period during which the electric current flows backward is defined as a time domain A.

Figure 4:
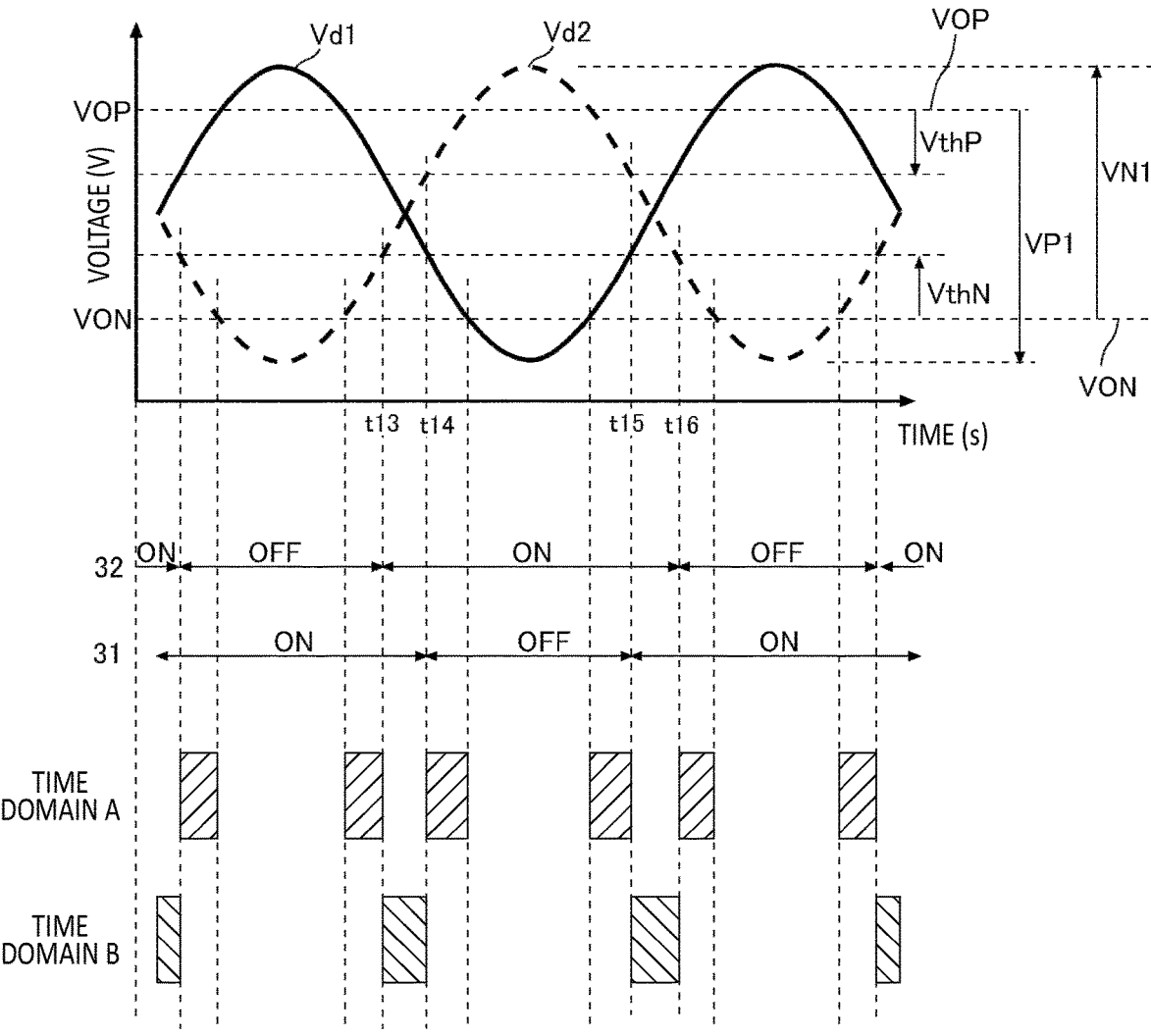
FIG. 4 illustrates an operation example of the rectifying circuit 220 in FIG. 1 for a case where voltages Vd1 and Vd2 having relatively great amplitude are inputted.

FIG. 4 illustrates an operation example of the rectifying circuit 220 in FIG. 1 for a case where voltages Vd1 and Vd2 having relatively great amplitude are inputted. In waveforms shown in FIG. 4, ratios of amplitude of the voltages Vd1 and Vd2 to the threshold voltages VthP and VthN are set to be greater than those in the waveforms shown in FIG. 3. In FIG. 4, the operations of the first transistor 31 and the second transistor 32 are described, and the description of the operations of the third transistor 33 and the fourth transistor 34 is omitted.

In the present example as well, time domains A are generated similarly to the example shown in FIG. 3. In addition, in the present example, due to an increase in the amplitude of the voltages Vd1 and Vd2, a time period during which each transistor is on is longer than a time period during which each transistor is off. In this case, the first transistor 31 and the second transistor 32 are turned on at the same time as in time periods t13 to t14 and t15 to t16 in FIG. 4. In the present specification, a time period during which the first transistor 31 and the second transistor 32 are turned on at the same time is defined as a time domain B. In the time domain B, a through current flows between the high voltage side output terminal 15 and the low voltage side output terminal 16, and electric power is consumed. The time domain A and the time domain B described in FIG. 3 and FIG. 4 are generated in the third transistor 33 and the fourth transistor 34 as well. In this manner, the rectifying circuit 220 in the reference example shown in FIG. 1 can perform rectification with high efficiency when input amplitude is low, but when the amplitude increases, efficiency rapidly decreases.

Figure 5:
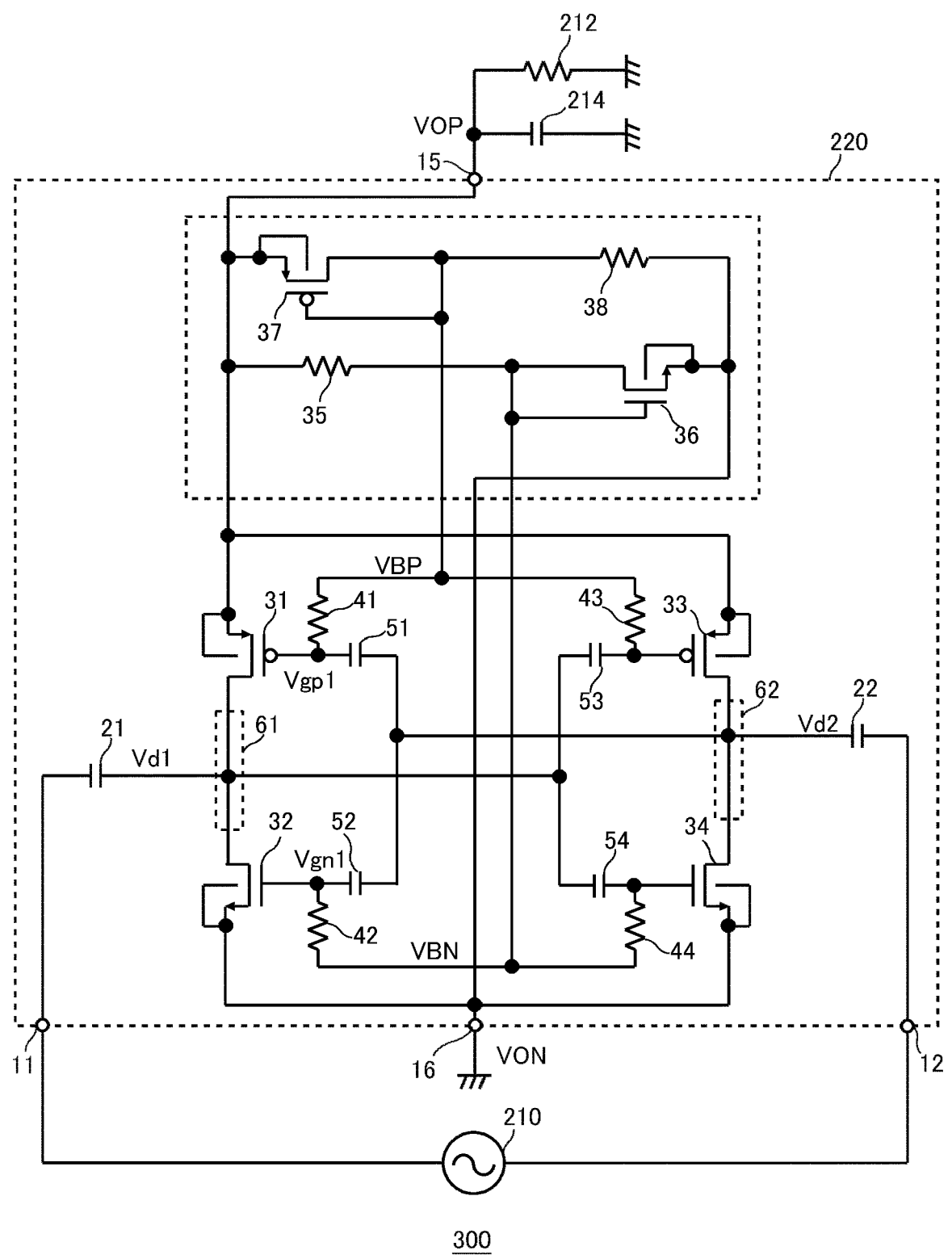
FIG. 5 shows an electric power source circuit 300 according to a second reference example.

FIG. 5 shows an electric power source circuit 300 according to a second reference example. The electric power source circuit 300 in the present example is different from that in the example shown in FIG. 1 in a configuration of a rectifying circuit 220. Other configurations are similar to those in the example shown in FIG. 1.

The rectifying circuit 220 in the present example has resistors 35, 38, 41, 42, 43, and 44, capacitors 51, 52, 53, and 54, as well as MOS transistors 36 and 37 in addition to the configuration of the rectifying circuit 220 in FIG. 1. A voltage Vd2 is applied to a gate terminal of a second transistor 32 via the capacitor 52. A voltage Vd2 applied to the gate terminal of the second transistor 32 is biased to a bias voltage VBN via the resistor 42. The voltage Vd2 is applied to a gate terminal of a first transistor 31 via the capacitor 51. The voltage Vd2 applied to the gate terminal of the first transistor 31 is biased to a bias voltage VBP via the resistor 41.

A voltage Vd1 is applied to a gate terminal of a fourth transistor 34 via the capacitor 54. The voltage Vd1 applied to the gate terminal of the fourth transistor 34 is biased to the bias voltage VBN via the resistor 44. The voltage Vd1 is applied to a gate terminal of a third transistor 33 via the capacitor 53. The voltage Vd1 applied to the gate terminal of the third transistor 33 is biased to the bias voltage VBP via the resistor 43.

The MOS transistor 36 and the resistor 35 generate the bias voltage VBN. The MOS transistor 36 has a drain terminal and a gate terminal coupled to each other. In the present specification, coupling between a drain terminal and a gate terminal of the same MOS transistor may be referred to as diode connection.

The MOS transistor 36 is arranged between a high voltage side output terminal 15 and a low voltage side output terminal 16. The resistor 35 is arranged between the MOS transistor 36 and the high voltage side output terminal 15. A voltage on a connection wiring line between the resistor 35 and the MOS transistor 36 is defined as the bias voltage VBN. The connection wiring line is coupled to the resistor 42 and the resistor 44.

When a voltage VOP of the high voltage side output terminal 15 is smaller than or equal to a threshold voltage of the transistor 36, the transistor 36 is turned off. In this case, the bias voltage VBN is approximately equal to the voltage VOP. When the voltage VOP becomes greater than the threshold voltage of the transistor 36, the transistor 36 is turned on, and an effective resistance value of the transistor 36 gradually decreases. Therefore, even if the voltage VOP further increases, the bias voltage VBN stabilizes at a value slightly greater than the threshold voltage of the transistor 36.

The MOS transistor 37 and the resistor 38 generate the bias voltage VBP. The MOS transistor 37 is diode connected. The MOS transistor 37 is arranged between the high voltage side output terminal 15 and the low voltage side output terminal 16. The resistor 38 is arranged between the MOS transistor 37 and the low voltage side output terminal 16. A voltage on a connection wiring line between the resistor 38 and the MOS transistor 37 is defined as the bias voltage VBP. The connection wiring line is coupled to the resistor 41 and the resistor 43. With such a configuration, the bias voltage VBP is generated similarly to the bias voltage VBN.

Figure 6:
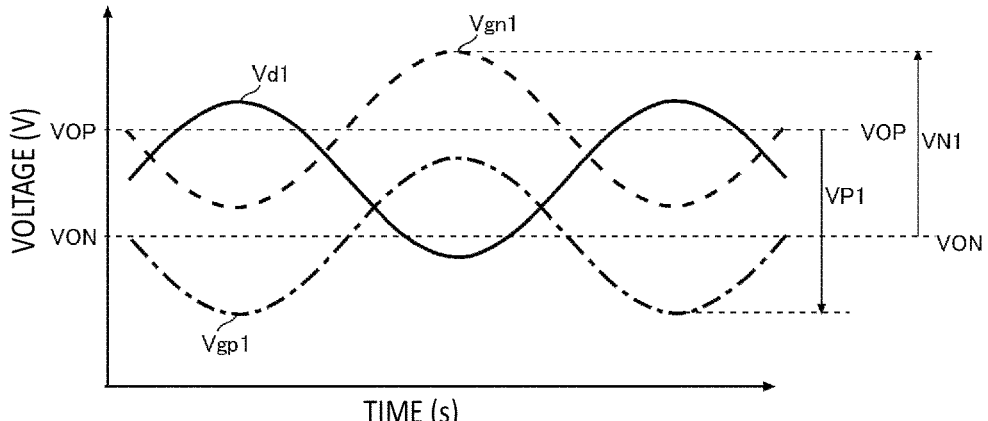
FIG. 6 shows an example of a voltage applied between a gate and a source of each transistor in a rectifying circuit 220 shown in FIG. 5.

FIG. 6 shows an example of a voltage applied between a gate and a source of each transistor in the rectifying circuit 220 shown in FIG. 5. In FIG. 6, gate-source voltages VP1 and VN1 of the first transistor 31 and the second transistor 32 are described, and a description of gate-source voltages of the third transistor 33 and the fourth transistor 34 is omitted. In the present example, a voltage applied to the gate terminal of the second transistor 32 is defined as Vgn1, and a voltage applied to the gate terminal of the first transistor 31 is defined as Vgp1.

When a voltage between the voltage VOP and the voltage VON is relatively small, the MOS transistor 36 and the MOS transistor 37 are turned off. In this case, the gate voltage Vgp1 biased to the voltage VON via the resistor 38 and the resistor 41 is applied to the gate terminal of the first transistor 31. In addition, the gate voltage Vgn1 biased to the voltage VOP via the resistor 35 and the resistor 42 is applied to the gate terminal of the second transistor 32. With respect to the gate voltage Vd2 in the example shown in FIG. 2, the gate voltage Vgn1 is biased to a positive side, and the gate voltage Vgp1 is biased to a negative side. Therefore, absolute values of the voltage VP1 and the voltage VN1 are greater than those in the example shown in FIG. 2, and a rectifying operation can be performed even with an alternating current voltage component having amplitude smaller than that in the example shown in FIG. 2.

When a voltage between the voltage VOP and the voltage VON is relatively great, the MOS transistor 36 and the MOS transistor 37 are turned on. In this case, the gate voltage Vgp1 biased according to a threshold voltage of the MOS transistor 37 is applied to the gate terminal of the first transistor 31. In addition, the gate voltage Vgn1 biased according to the threshold voltage of the MOS transistor 36 is applied to the gate terminal of the second transistor 32. Therefore, a percentage of a time when the first transistor 31 and the second transistor 32 are turned on (that is, a percentage of the time when they are turned on with respect to a sum of the time when they are turned on and a time when they are turned off) is suppressed to approximately 50% at a maximum. Therefore, generation of the time domains B shown in FIG. 4 can be suppressed, and the through current which flows between the high voltage side output terminal 15 and the low voltage side output terminal 16 can be suppressed to some extent. However, since the time domains A shown in FIG. 3 are generated, an electric current flows backward at each output terminal, and the efficiency of the electric power supply decreases.

Figure 7:
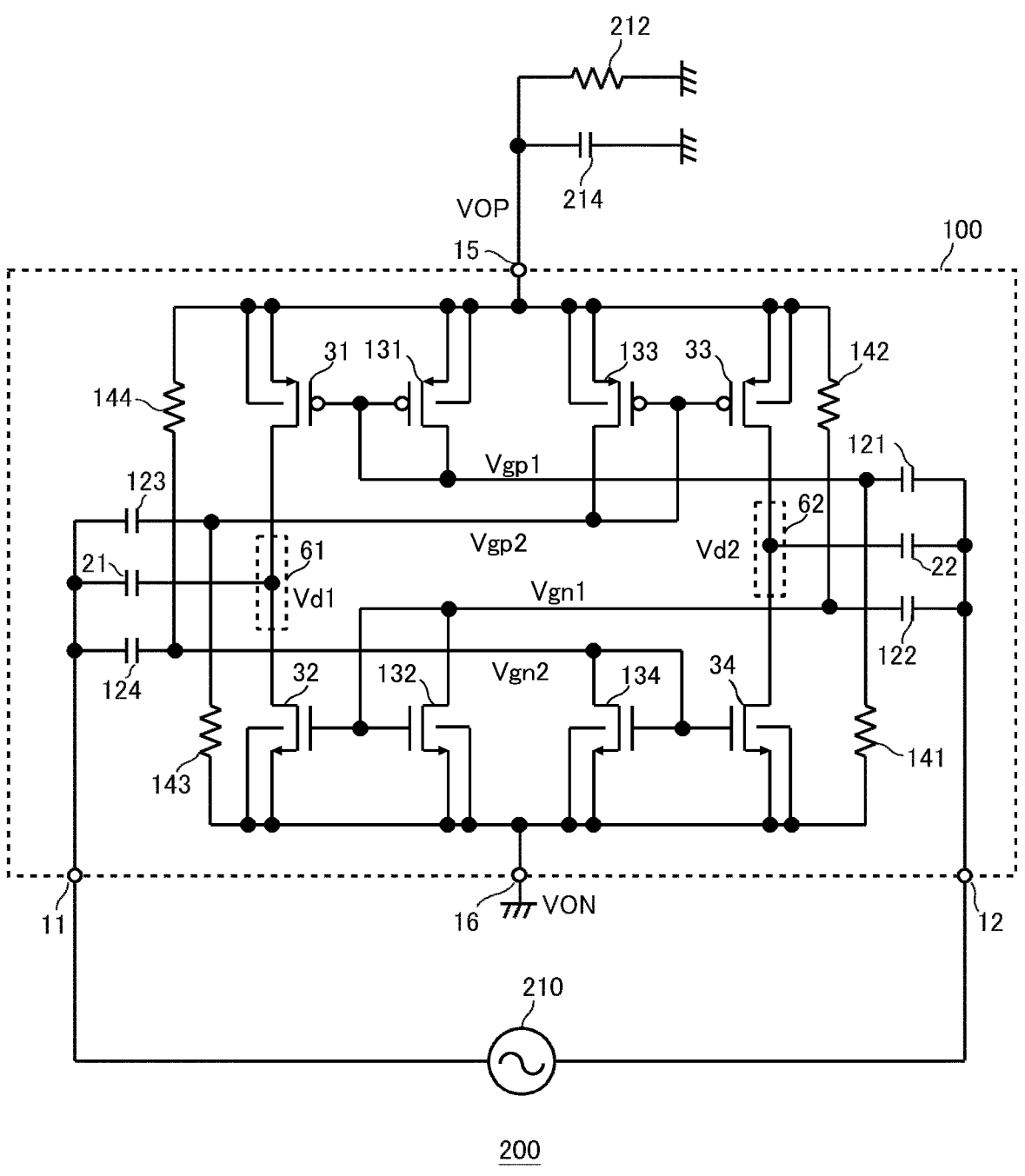
FIG. 7 shows an example of an electric power source circuit 200 according to one embodiment of the present invention.

FIG. 7 shows an example of an electric power source circuit 200 according to one embodiment of the present invention. The electric power source circuit 200 includes an electric power source 210 and a rectifying circuit 100. The electric power source 210 is similar to those in the examples described in FIG. 1 to FIG. 6. In addition, in the rectifying circuit 100, components similar to the components described in FIG. 1 to FIG. 6 are marked with the same reference numerals as those in the examples shown in FIG. 1 to FIG. 6. The components marked with the same reference numerals as those in the examples shown in FIG. 1 to FIG. 6 have the configurations and functions described in FIG. 1 to FIG. 6, unless otherwise specified. The rectifying circuit 100 includes a first bias unit 131, a second bias unit 132, a third bias unit 133, and a fourth bias unit 134 in addition to the configuration of the rectifying circuit 220 shown in FIG. 1.

The first bias unit 131 generates a gate signal Vgp1 obtained by biasing an alternating current voltage component of alternating current electric power inputted to a second input terminal 12 according to magnitude of amplitude of the alternating current voltage component. The gate signal Vgp1 is inputted to a gate terminal of a first transistor 31. For example, the first bias unit 131 biases the alternating current voltage component with a first bias voltage (for example, a voltage VON) when the magnitude of the amplitude of the alternating current voltage component is smaller than or equal to a first threshold voltage, and biases the alternating current voltage component with a voltage closer to a voltage VOP of a high voltage side output terminal 15 than the first bias voltage when the magnitude of the amplitude of the alternating current voltage component is greater than the first threshold voltage.

The first bias unit 131 in the present example is a diode connected P channel MOS transistor. The first bias unit 131 may have the same threshold voltage as that of the first transistor 31. A drain terminal and a gate terminal of the first bias unit 131 are coupled to the gate terminal of the first transistor 31, and a source terminal of the first bias unit 131 is coupled to the high voltage side output terminal 15. The first threshold voltage described above is a voltage at which the first bias unit 131 starts to be turned on. The first bias unit 131 is provided between the high voltage side output terminal 15 and a low voltage side output terminal 16, and has a gate terminal to which the gate voltage Vgp1 corresponding to the alternating current voltage component at the second input terminal 12 is applied.

In the present example, a first capacitor 121 is provided between the drain terminal of the first bias unit 131 and the second input terminal 12. The first capacitor 121 is directly coupled to neither a first connection portion 61 nor a second connection portion 62 with no intervention of another capacitor. A bias voltage at the first connection portion 61 and the second connection portion 62 is different from a bias voltage of the gate voltage Vgp1. In addition, a first bias resistor 141 is provided between the drain terminal of the first bias unit 131 and the low voltage side output terminal 16. The first capacitor 121 allows passage of the alternating current voltage component of the alternating current electric power inputted to the second input terminal 12. A signal obtained by biasing the alternating current voltage component to a predetermined voltage becomes the gate signal Vgp1. Depending on an on/off state of the first bias unit 131, it is switched whether the alternating current voltage component is biased to a voltage VOP side or biased to a voltage VON side via the first bias resistor 141. Such a structure allows the first bias unit 131 to bias a gate voltage applied to the first transistor 31 according to the amplitude of the alternating current voltage component.

The second bias unit 132 generates a gate signal Vgn1 obtained by biasing the alternating current voltage component of the alternating current electric power inputted to the second input terminal 12 according to the magnitude of the amplitude of the alternating current voltage component. The gate signal Vgn1 is inputted to a gate terminal of a second transistor 32. For example, the second bias unit 132 biases the alternating current voltage component with the second bias voltage (for example, the voltage VOP) when the magnitude of the amplitude of the alternating current voltage component is smaller than or equal to a second threshold voltage, and biases the alternating current voltage component with a voltage closer to the voltage VON of the low voltage side output terminal 16 than the second bias voltage when the magnitude of the amplitude of the alternating current voltage component is greater than the second threshold voltage.

The second bias unit 132 in the present example is a diode connected N channel MOS transistor. The second bias unit 132 may have the same threshold voltage as that of the second transistor 32. A drain terminal and a gate terminal of the second bias unit 132 are coupled to the gate terminal of the second transistor 32, and a source terminal of the second bias unit 132 is coupled to the low voltage side output terminal 16. The second threshold voltage described above is a voltage at which the second bias unit 132 starts to be turned on. The second bias unit 132 is provided between the high voltage side output terminal 15 and the low voltage side output terminal 16, and has a gate terminal to which the gate voltage Vgn1 corresponding to the alternating current voltage component at the second input terminal 12 is applied.

In the present example, a second capacitor 122 is provided between the drain terminal of the second bias unit 132 and the second input terminal 12. The second capacitor 122 is directly coupled to neither the first connection portion 61 nor the second connection portion 62 with no intervention of another capacitor. A bias voltage at the first connection portion 61 and the second connection portion 62 is different from a bias voltage of the gate voltage Vgn1. In addition, a second bias resistor 142 is provided between the drain terminal of the second bias unit 132 and the high voltage side output terminal 15. The second capacitor 122 allows passage of the alternating current voltage component of the alternating current electric power inputted to the second input terminal 12. A signal obtained by biasing the alternating current voltage component to a predetermined voltage becomes the gate signal Vgn1. Depending on an on/off state of the second bias unit 132, it is switched whether the alternating current voltage component is biased to the voltage VOP side or biased to the voltage VON side via the second bias resistor 142. Such a structure allows the second bias unit 132 to bias a gate voltage applied to the second transistor 32 according to the amplitude of the alternating current voltage component.

The third bias unit 133 generates a gate signal Vgp2 obtained by biasing the alternating current voltage component of the alternating current electric power inputted to the first input terminal 11 according to the magnitude of the amplitude of the alternating current voltage component. The gate signal Vgp2 is inputted to a gate terminal of a third transistor 33. For example, the third bias unit 133 biases the alternating current voltage component with the first bias voltage (for example, the voltage VON) when the magnitude of the amplitude of the alternating current voltage component is smaller than or equal to the first threshold voltage, and biases the alternating current voltage component with the voltage closer to the voltage VOP of the high voltage side output terminal 15 than the first bias voltage when the magnitude of the amplitude of the alternating current voltage component is greater than the first threshold voltage.

The third bias unit 133 in the present example is a diode connected P channel MOS transistor. The third bias unit 133 may have the same threshold voltage as that of the third transistor 33. A drain terminal and a gate terminal of the third bias unit 133 are coupled to the gate terminal of the third transistor 33, and a source terminal of the third bias unit 133 is coupled to the high voltage side output terminal 15. In addition, a threshold voltage of the third bias unit 133 is the first threshold voltage described above. The third bias unit 133 is provided between the high voltage side output terminal 15 and the low voltage side output terminal 16, and has a gate terminal to which the gate voltage Vgp2 corresponding to the alternating current voltage component at the first input terminal 11 is applied.

In the present example, a third capacitor 123 is provided between the drain terminal of the third bias unit 133 and the first input terminal 11. In addition, a third bias resistor 143 is provided between the drain terminal of the third bias unit 133 and the low voltage side output terminal 16. The third capacitor 123 allows passage of the alternating current voltage component of the alternating current electric power inputted to the first input terminal 11. A signal obtained by biasing the alternating current voltage component to a predetermined voltage becomes the gate signal Vgp2. Depending on an on/off state of the third bias unit 133, it is switched whether the alternating current voltage component is biased to the voltage VOP side or biased to the voltage VON side via the third bias resistor 143. Such a structure allows the third bias unit 133 to bias a gate voltage applied to the third transistor 33 according to the amplitude of the alternating current voltage component.

The fourth bias unit 134 generates a gate signal Vgn2 obtained by biasing the alternating current voltage component of the alternating current electric power inputted to the first input terminal 11 according to the magnitude of the amplitude of the alternating current voltage component. The gate signal Vgn2 is inputted to a gate terminal of a fourth transistor 34. For example, the fourth bias unit 134 biases the alternating current voltage component with the second bias voltage (for example, the voltage VOP) when the magnitude of the amplitude of the alternating current voltage component is smaller than or equal to the second threshold voltage, and biases the alternating current voltage component with the voltage closer to the voltage VON of the low voltage side output terminal 16 than the second bias voltage when the magnitude of the amplitude of the alternating current voltage component is greater than the second threshold voltage.

The fourth bias unit 134 in the present example is a diode connected N channel MOS transistor. The fourth bias unit 134 may have the same threshold voltage as that of the fourth transistor 34. A drain terminal and a gate terminal of the fourth bias unit 134 are coupled to the gate terminal of the fourth transistor 34, and a source terminal of the fourth bias unit 134 is coupled to the low voltage side output terminal 16. In addition, a threshold voltage of the fourth bias unit 134 is the second threshold voltage described above. The fourth bias unit 134 is provided between the high voltage side output terminal 15 and the low voltage side output terminal 16, and has a gate terminal to which the gate voltage Vgn2 corresponding to the alternating current voltage component at the first input terminal 11 is applied.

In the present example, a fourth capacitor 124 is provided between the drain terminal of the fourth bias unit 134 and the first input terminal 11. In addition, a fourth bias resistor 144 is provided between the drain terminal of the fourth bias unit 134 and the high voltage side output terminal 15. The fourth capacitor 124 allows passage of the alternating current voltage component of the alternating current electric power inputted to the first input terminal 11. A signal obtained by biasing the alternating current voltage component to a predetermined voltage becomes the gate signal Vgn2. Depending on an on/off state of the fourth bias unit 134, it is switched whether the alternating current voltage component is biased to the voltage VOP side or biased to the voltage VON side via the fourth bias resistor 144. Such a structure allows the fourth bias unit 134 to bias a gate voltage applied to the fourth transistor 34 according to the amplitude of the alternating current voltage component.

Since the rectifying circuit 100 has a differential configuration, operations of the first transistor 31, the first bias unit 131, the second transistor 32, and the second bias unit 132 will be mainly described, but the third transistor 33, the third bias unit 133, the fourth transistor 34, and the fourth bias unit 134 operate in a similar manner.

First, a case where the amplitude of the alternating current voltage component from the electric power source 210 is relatively small will be described. The gate voltage Vgp1 and the gate voltage Vgn1 for a case where the amplitude of the alternating current voltage component is relatively small are similar to those in the example shown in FIG. 6.

When the amplitude of the alternating current voltage component is relatively small, the first bias unit 131 is turned off. When the first bias unit 131 is off, the gate voltage Vgp1 inputted to the gate terminal of the first transistor 31 is biased with the voltage VON via the first bias resistor 141.

When amplitude of a voltage Vd1 (a voltage between 0 V and a peak) applied to the first connection portion 61 reaches one third of a threshold voltage of the first transistor 31, a voltage difference between the voltage VOP and the voltage VON becomes two third of the threshold voltage of the first transistor 31. Since the gate voltage Vgp1 of the first transistor 31 has amplitude equivalent to that of the voltage Vd1, a minimum value VP1 (which is, however, a maximum value as an absolute value) of a gate-source voltage of the first transistor 31 reaches the threshold voltage of the first transistor 31. As a result, the first transistor 31 is turned on, and electric power is transmitted from the first connection portion 61 to the high voltage side output terminal 15.

When the amplitude of the alternating current voltage component is relatively small, the second bias unit 132 is turned off. When the second bias unit 132 is off, the gate voltage Vgn1 inputted to the gate terminal of the second transistor 32 is biased with the voltage VOP via the second bias resistor 142. As shown in FIG. 6, the gate voltage Vgn1 in the present example is of a sine wave which is biased with a different level from the gate voltage Vgp1 and has an inverted waveform.

When the amplitude of the voltage Vd1 (the voltage between 0 V and the peak) applied to the first connection portion 61 reaches one third of a threshold voltage of the second transistor 32, the voltage difference between the voltage VOP and the voltage VON becomes two third of the threshold voltage of the second transistor 32. Since the gate voltage Vgn1 of the second transistor 32 has the amplitude equivalent to that of the voltage Vd1, a maximum value VN1 of a gate-source voltage of the second transistor 32 reaches the threshold voltage of the first transistor 31. As a result, the first transistor 31 is turned on, and the electric power is transmitted from the first connection portion 61 to the high voltage side output terminal 15. In this manner, the rectifying circuit 100 in FIG. 7 can perform a rectifying operation even when the amplitude of the alternating current voltage component is smaller than (for example, an amplitude ratio is two third of) that in the rectifying circuit 220 shown in FIG. 1.

Figure 8:
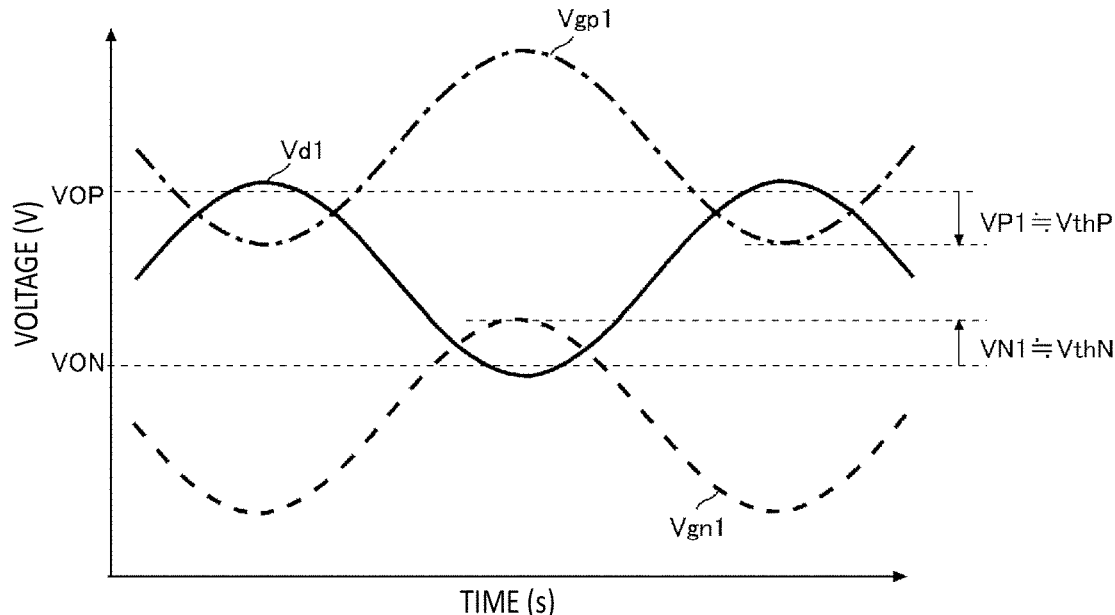
FIG. 8 illustrates an operation of a rectifying circuit 100 for a case where amplitude of alternating current voltage components (Vd1, Vd2) is relatively great.

FIG. 8 illustrates an operation of the rectifying circuit 100 for a case where amplitude of alternating current voltage components (Vd1, Vd2) is relatively great. When the amplitude of the alternating current voltage components is greater than the first threshold voltage, the first bias unit 131 is turned on. The gate voltage Vgp1 is biased to a voltage corresponding to the amplitude of the alternating current voltage components by the first bias unit 131 and the first bias resistor 141. The gate voltage Vgp1 in the present example is biased with a voltage closer to the voltage VOP than the voltage VON as shown in FIG. 8. In addition, when the amplitude of the alternating current voltage components is greater than the second threshold voltage, the second bias unit 132 is turned on. The gate voltage Vgn1 is biased to the voltage corresponding to the amplitude of the alternating current voltage components by the second bias unit 132 and the second bias resistor 142. The gate voltage Vgn1 in the present example is biased with a voltage closer to the voltage VON than the voltage VOP as shown in FIG. 8. As shown in FIG. 8, the first bias unit 131 may bias the gate voltage Vgp1 at a voltage higher than the voltage VOP of the high voltage side output terminal 15 when the magnitude of the amplitude of the alternating current voltage components is greater than the first threshold voltage. The second bias unit 132 may bias the gate voltage Vgn1 at a voltage lower than the voltage VON of the low voltage side output terminal 16 when the magnitude of the amplitude of the alternating current voltage components is greater than the second threshold voltage.

When the amplitude of the voltage Vd1 (0 V to a peak voltage) of the first connection portion 61 becomes greater than one third of the threshold voltage of the first transistor 31, a minimum value (a maximum value in terms of an absolute value) VP1 of a gate-source voltage of the first bias unit 131 shown in FIG. 8 decreases beyond a threshold voltage VthP of the first bias unit 131, and an electric current flows through the first bias unit 131. Therefore, the minimum value VP1 of the gate-source voltage of the first transistor 31 will not be significantly smaller than the threshold voltage of the first bias unit 131 and the first transistor 31 (a threshold voltage of a PMOS transistor). Accordingly, the bias voltage of the voltage Vgp1 shifts to a high voltage side with an increase in alternating current signal components (Vd1, Vd2) such that the voltage VP1 remains slightly smaller than the threshold voltage VthP. The first bias unit 131 may increase the bias voltage for the gate voltage Vgp1 as amplitude of the alternating current signal components is greater.

When the amplitude of the voltage Vd1 (0 V to the peak voltage) of the first connection portion 61 becomes greater than one third of the threshold voltage of the second transistor 32, the minimum value (a maximum value in terms of an absolute value) VN1 of a gate-source voltage of the second bias unit 132 shown in FIG. 8 increases beyond a threshold voltage VthN of the second bias unit 132, and the electric current flows through the second bias unit 132.

Therefore, the maximum value VN1 of the gate-source voltage of the second transistor 32 will not be significantly greater than the threshold voltage of the second bias unit 132 and the second transistor 32 (a threshold voltage of an NMOS transistor). Accordingly, the bias voltage of the voltage Vgn1 shifts to a low voltage side with an increase in the alternating current signal components (Vd1, Vd2) such that the voltage VN1 remains slightly greater than the threshold voltage VthN. The second bias unit 132 may decrease the bias voltage for the gate voltage Vgn1 as the amplitude of the alternating current signal components is greater.

Such an operation can shorten each of a time period during which the first transistor 31 is turned on and a time period during which the second transistor 32 is turned on. Therefore, the time domains B shown in FIG. 4 are not generated, and the time domains A shown in FIG. 3 and FIG. 4 are not generated either. Therefore, the rectifying circuit 100 can perform a rectifying operation with high efficiency even if the amplitude of the inputted alternating current voltage components increases.

The rectifying circuit 100 in FIG. 7 has a first input capacitor 21 and a second input capacitor 22. Note that, however, the first input capacitor 21 and the second input capacitor 22 may not be provided when a direct current common mode impedance of the electric power source 210 is sufficiently high.

Figure 9:
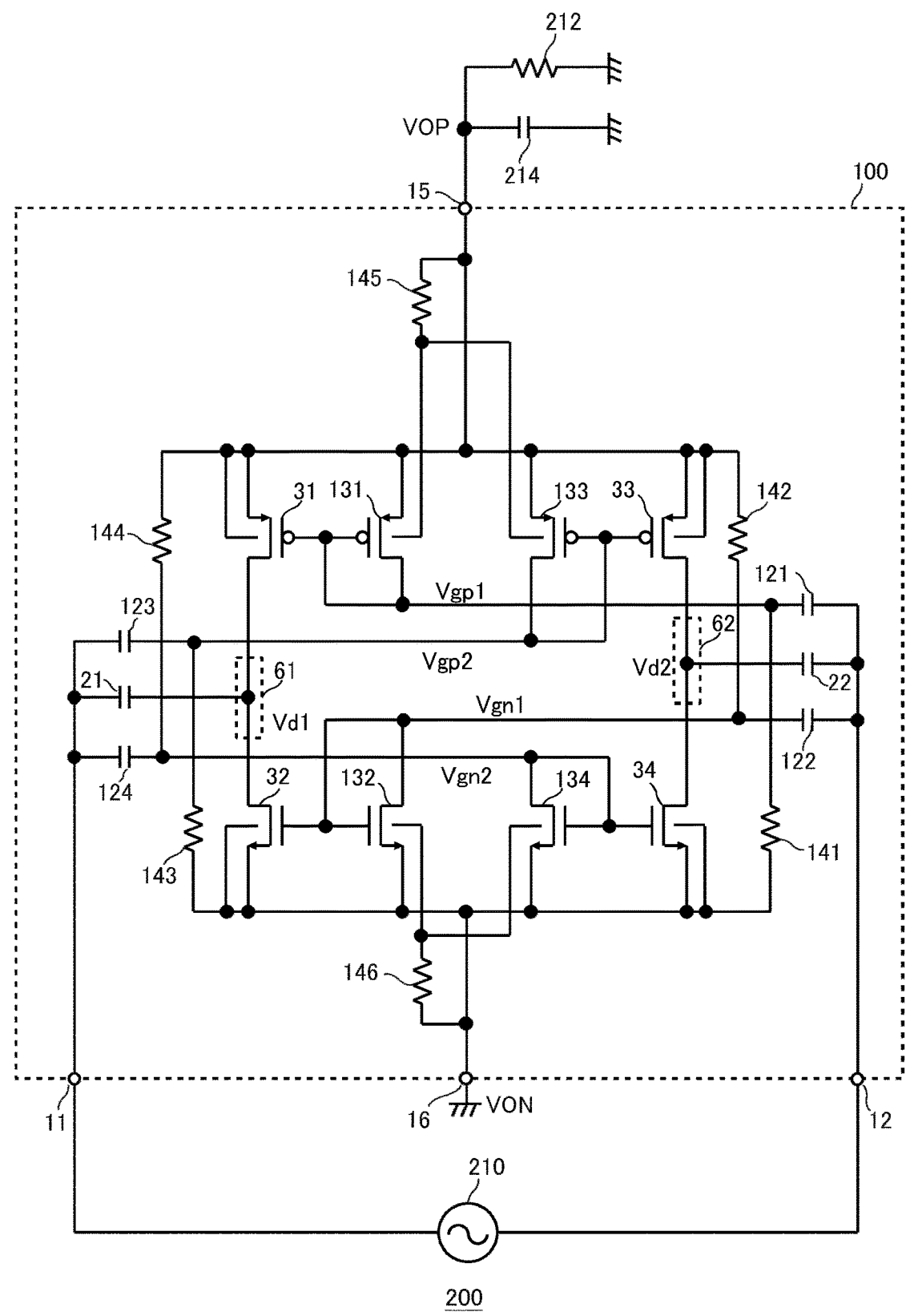
FIG. 9 shows another configuration example of a rectifying circuit 100.

FIG. 9 shows another configuration example of a rectifying circuit 100. The rectifying circuit 100 in the present example includes a high voltage side bulk resistor 145 and a low voltage side bulk resistor 146 in addition to the configuration of the rectifying circuit 100 shown in FIG. 7. Other structures are similar to those in the example shown in FIG. 7.

The high voltage side bulk resistor 145 sets a resistance value from a high voltage side output terminal 15 to a bulk of a first bias unit 131 higher than a resistance value from the high voltage side output terminal 15 to a bulk of a first transistor 31. When the high voltage side bulk resistor 145 is not provided, the resistance value from the high voltage side output terminal 15 to the bulk of the first bias unit 131 is the same as the resistance value from the high voltage side output terminal 15 to the bulk of the first transistor 31. In the present example, a path from the high voltage side output terminal 15 to the bulk of the first bias unit 131 is provided to be branched from a path from the high voltage side output terminal 15 to the bulk of the first transistor 31. The high voltage side bulk resistor 145 is provided in the path from the high voltage side output terminal 15 to the bulk of the first bias unit 131 which has been branched. In addition, a path from the high voltage side bulk resistor 145 to the bulk of the first bias unit 131 is branched and coupled to a bulk of the third bias unit 133 as well.

The low voltage side bulk resistor 146 sets a resistance value from a low voltage side output terminal 16 to a bulk of a second bias unit 132 higher than a resistance value from the low voltage side output terminal 16 to a bulk of a second transistor 32. When the low voltage side bulk resistor 146 is not provided, the resistance value from the low voltage side output terminal 16 to the bulk of a second bias unit 132 is the same as the resistance value from the low voltage side output terminal 16 to the bulk of the second transistor 32. In the present example, a path from the low voltage side output terminal 16 to the bulk of the second bias unit 132 is provided to be branched from a path from the low voltage side output terminal 16 to the bulk of the second transistor 32. The low voltage side bulk resistor 146 is provided in the path from the low voltage side output terminal 16 to the bulk of the second bias unit 132 which has been branched. In addition, a path from the low voltage side bulk resistor 146 to the bulk of the second bias unit 132 is branched and coupled to a bulk of the fourth bias unit 134 as well.

In the example shown in FIG. 7, a parasitic diode is provided between the drain terminal of the first bias unit 131 and the bulk. When the gate voltage Vgp1 greatly exceeds the voltage VOP and exceeds a forward voltage threshold of the parasitic diode, a negative electric current flows from the bulk of the first bias unit 131 coupled to the high voltage side output terminal 15 to the drain terminal of the first bias unit 131, and is charged in the first capacitor 121. When amplitude of the gate voltage Vgp1 is reversed, the electric current charged in the first capacitor 121 flows from the drain terminal to the source terminal of the first bias unit 131, and flows to the high voltage side output terminal 15. During this time, an electric power source 210 will charge and discharge the first capacitor 121, which causes an insertion loss. A similar insertion loss is caused in another bias unit as well.

In the present example, providing the high voltage side bulk resistor 145 and the low voltage side bulk resistor 146 can suppress an electric current flowing between the bulk of each bias unit and each output terminal. Therefore, it is possible to decrease charging and discharging of the first capacitor 121, a second capacitor 122, a third capacitor 123, and a fourth capacitor 124, and to reduce the insertion loss. The rectifying circuit 100 may have both the high voltage side bulk resistor 145 and the low voltage side bulk resistor 146, or may have only one of them.

Figure 10:
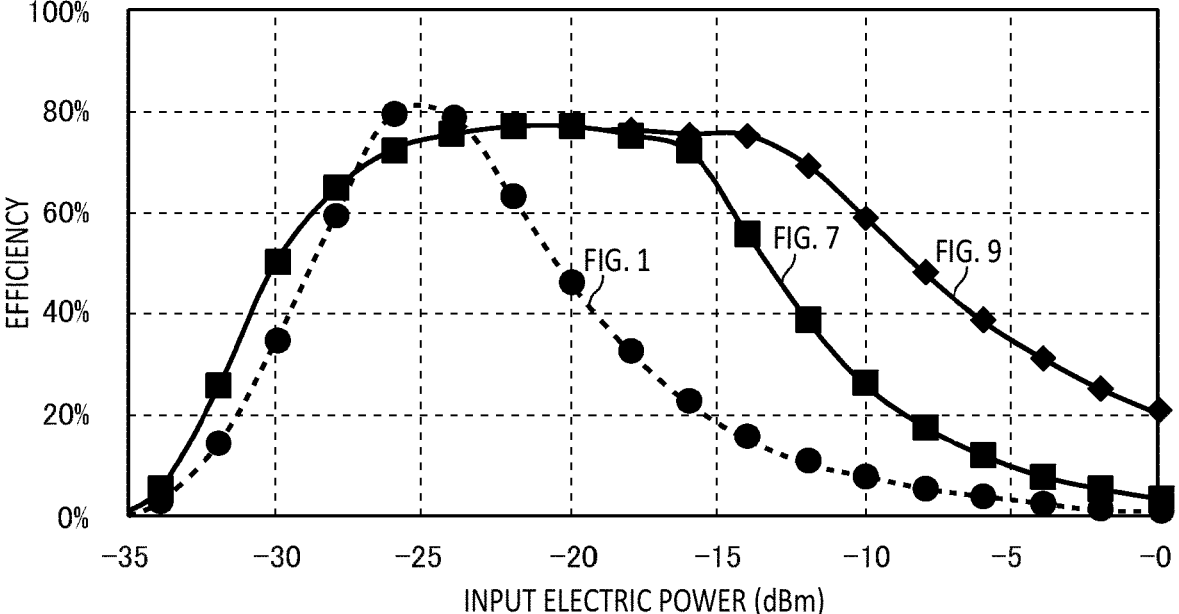
FIG. 10 shows relationships between input electric power and efficiency in the reference example shown in FIG. 1, the embodiment example shown in FIG. 7, and the embodiment example shown in FIG. 9.

FIG. 10 shows relationships between input electric power and efficiency in the reference example shown in FIG. 1, the embodiment example shown in FIG. 7, and the embodiment example shown in FIG. 9. In the present example, an output impedance of the electric power source 210 is 50Ω, and a frequency of the alternating current electric power is 1 GHz. In the present example, an appropriately adjusted impedance matching circuit is inserted between the electric power source 210 and the rectifying circuit. In addition, the resistor 212 as the load is 100 kΩ.

The input electric power from the electric power source 210 is defined as $Pin=Vs^2/(4\times50)$ with respect to an effective value Vs of an output voltage of the electric power source 210 at no load. An output electric power supplied from the rectifying circuit to the resistor 212 is defined as Pout. The efficiency in FIG. 10 is a ratio of the output electric power Pout to the input electric power Pin (Pout/Pin).

The example shown in FIG. 1 shows high efficiency when the input electric power is around −25 dBm. Note that, however, changing magnitude of the input electric power rapidly decreases the efficiency regardless of whether the electric power is smaller or greater. In the example shown in FIG. 1, an electric power range over which the efficiency exceeds 50% is less than 10 dB. On the other hand, in the examples shown in FIG. 7 and FIG. 9, rectification can be performed with high efficiency from a smaller electric power to a greater electric power. For example, a rectifying operation can be performed with efficiency greater than or equal to 60% over a wide electric power domain.

While the present invention has been described by way of the embodiments, the technical scope of the present invention is not limited to the above described embodiments. It is apparent to persons skilled in the art that various alterations or improvements can be made to the above described embodiments. It is also apparent from the description of the claims that embodiments added with such alterations or improvements can be included in the technical scope of the present invention.

EXPLANATION OF REFERENCES

11: first input terminal, 12: second input terminal, 15: high voltage side output terminal, 16: low voltage side output terminal, 21: first input capacitor, 22: second input capacitor, 31: first transistor, 32: second transistor, 33: third transistor, 34: fourth transistor, 35: resistor, 36: transistor, 37: transistor, 38: resistor, 41, 42, 43, 44: resistor, 51, 52, 53, 54: capacitor, 61: first connection portion, 62: second connection portion, 100: rectifying circuit, 121: first capacitor, 122: second capacitor, 123: third capacitor, 124: fourth capacitor, 131: first bias unit, 132: second bias unit, 133: third bias unit, 134: fourth bias unit, 141: first bias resistor, 142: second bias resistor, 143: third bias resistor, 144: fourth bias resistor, 145: high voltage side bulk resistor, 146: low voltage side bulk resistor, 200: electric power source circuit, 210: electric power source, 212: resistor, 214: smoothing capacitor, 220: rectifying circuit, and 300: electric power source circuit.

What is claimed is:

1. A rectifying circuit comprising: a first input terminal and a second input terminal to which alternating current electric power having mutually opposite phases is inputted; and a high voltage side output terminal and a low voltage side output terminal which output direct current electric power obtained by rectifying the alternating current electric power, the rectifying circuit comprising:

a first transistor provided between the high voltage side output terminal and the low voltage side output terminal;

a second transistor provided between the first transistor and the low voltage side output terminal and having a different channel type from that of the first transistor;

a first connection portion which couples drain terminals of the first transistor and the second transistor and to which a voltage corresponding to the alternating current electric power inputted to the first input terminal is applied;

a first bias unit which biases an alternating current voltage component of the alternating current electric power inputted to the second input terminal according to a magnitude of an amplitude of the alternating current voltage component and inputs the alternating current voltage component, which has been biased, to a gate terminal of the first transistor; and a second bias unit which biases the alternating current voltage component of the alternating current electric power inputted to the second input terminal according to the magnitude of the amplitude of the alternating current voltage component and inputs the alternating current voltage component, which has been biased, to a gate terminal of the second transistor, wherein when the magnitude of the amplitude of the alternating current voltage component is smaller than or equal to a first threshold voltage, the first bias unit biases the alternating current voltage component with a first bias voltage, and when the magnitude of the amplitude of the alternating current voltage component is greater than the first threshold voltage, the first bias unit biases the alternating current voltage component with a voltage closer to a voltage of the high voltage side output terminal than the first bias voltage.

16

2. The rectifying circuit according to claim 1, further comprising:

a first capacitor provided between the second input terminal and the first bias unit; and a second capacitor provided between the second input terminal and the second bias unit.

3. The rectifying circuit according to claim 2, further comprising:

a third transistor provided between the high voltage side output terminal and the low voltage side output terminal;

a fourth transistor provided between the third transistor and the low voltage side output terminal and having a different channel type from that of the third transistor; and a second connection portion which couples drain terminals of the third transistor and the fourth transistor and to which a voltage corresponding to the alternating current electric power inputted to the second input terminal is applied.

4. The rectifying circuit according to claim 3, wherein the first capacitor and the second capacitor are not directly coupled to the second connection portion.

5. The rectifying circuit according to claim 3, further comprising:

a third bias unit which biases an alternating current voltage component of the alternating current electric power inputted to the first input terminal according to the magnitude of the amplitude of the alternating current voltage component and inputs the alternating current voltage component, which has been biased, to a gate terminal of the third transistor; and a fourth bias unit which biases the alternating current voltage component of the alternating current electric power inputted to the first input terminal according to the magnitude of the amplitude of the alternating current voltage component and inputs the alternating current voltage component, which has been biased, to a gate terminal of the fourth transistor.

6. The rectifying circuit according to claim 1, wherein the first bias unit is provided between the high voltage side output terminal and the low voltage side output terminal, has a gate terminal to which the alternating current voltage component at the second input terminal is applied, and is a diode connected transistor, when the magnitude of the amplitude of the alternating current voltage component is smaller than or equal to the first threshold voltage, the first bias voltage corresponds to a voltage of the low voltage side output terminal, and when the magnitude of the amplitude of the alternating current voltage component is greater than the first threshold voltage, the voltage closer to the voltage of the high voltage side output terminal than the first bias voltage is higher than the voltage of the high voltage side output terminal.

7. The rectifying circuit according to claim 6, wherein when the magnitude of the amplitude of the alternating current voltage component is greater than the first threshold voltage, the first bias unit increases the voltage closer to the voltage of the high voltage side output terminal than the first bias voltage as the amplitude of the alternating current voltage component is greater.

8. The rectifying circuit according to claim 6, further comprising a first bias resistor provided between a drain terminal of the first bias unit and the low voltage side output terminal, wherein the drain terminal of the first bias unit is coupled to the gate terminal of the first transistor.

9. The rectifying circuit according to claim 1, wherein when the magnitude of the amplitude of the alternating current voltage component is smaller than or equal to a second threshold voltage, the second bias unit biases the alternating current voltage component with a second bias voltage, and when the magnitude of the amplitude of the alternating current voltage component is greater than the second threshold voltage, the second bias unit biases the alternating current voltage component to a voltage closer to a voltage of the low voltage side output terminal than the second bias voltage.

10. The rectifying circuit according to claim 9, wherein the second bias unit is provided between the high voltage side output terminal and the low voltage side output terminal, has a gate terminal to which the alternating current voltage component at the second input terminal is applied, and is a diode connected transistor, when the magnitude of the amplitude of the alternating current voltage component is smaller than or equal to the second threshold voltage, the second bias voltage corresponds to the voltage of the high voltage side output terminal, and when the magnitude of the amplitude of the alternating current voltage component is greater than the second threshold voltage, the voltage closer to the voltage of the low voltage side output terminal than the second bias voltage is lower than the voltage of the low voltage side output terminal.

11. The rectifying circuit according to claim 10, wherein when the magnitude of the amplitude of the alternating current voltage component is greater than the second threshold voltage, the second bias unit decreases the voltage closer to the voltage of the low voltage side output terminal than the second bias voltage as the amplitude of the alternating current voltage component is greater.

12. The rectifying circuit according to claim 10, further comprising a second bias resistor provided between a drain terminal of the second bias unit and the high voltage side output terminal, wherein the drain terminal of the second bias unit is coupled to the gate terminal of the second transistor.

13. The rectifying circuit according to claim 8, further comprising a high voltage side bulk resistor which set a resistance value from the high voltage side output terminal to a bulk of the first bias unit higher than a resistance value from the high voltage side output terminal to a bulk of the first transistor.

14. The rectifying circuit according to claim 12, further comprising a low voltage side bulk resistor which sets a resistance value from the low voltage side output terminal to a bulk of the second bias unit higher than a resistance value from the low voltage side output terminal to a bulk of the second transistor.

15. An electric power source circuit comprising: an electric power source which generates alternating current electric power; and a rectifying circuit which rectifies the alternating current electric power for an output, wherein the rectifying circuit has:

a first input terminal and a second input terminal to which the alternating current electric power having mutually opposite phases is inputted;

a high voltage side output terminal and a low voltage side output terminal which output direct current electric power obtained by rectifying the alternating current electric power;

a first transistor provided between the high voltage side output terminal and the low voltage side output terminal;

a second transistor provided between the first transistor and the low voltage side output terminal and having a different channel type from that of the first transistor;

a first connection portion which couples drain terminals of the first transistor and the second transistor and to which a voltage corresponding to the alternating current electric power inputted to the first input terminal is applied;

a first bias unit which biases an alternating current voltage component of the alternating current electric power inputted to the second input terminal according to a magnitude of an amplitude of the alternating current voltage component and inputs the alternating current voltage component, which has been biased, to a gate terminal of the first transistor; and a second bias unit which biases the alternating current voltage component of the alternating current electric power inputted to the second input terminal according to the magnitude of the amplitude of the alternating current voltage component and inputs the alternating current voltage component, which has been biased, to a gate terminal of the second transistor, wherein when the magnitude of the amplitude of the alternating current voltage component is smaller than or equal to a first threshold voltage, the first bias unit biases the alternating current voltage component with a first bias voltage, and when the magnitude of the amplitude of the alternating current voltage component is greater than the first threshold voltage, the first bias unit biases the alternating current voltage component with a voltage closer to a voltage of the high voltage side output terminal than the first bias voltage.

16. The electric power source circuit according to claim 15, wherein the rectifying circuit further has:

a first capacitor provided between the second input terminal and the first bias unit; and a second capacitor provided between the second input terminal and the second bias unit.

17. The electric power source circuit according to claim 16, wherein the rectifying circuit further has:

a third transistor provided between the high voltage side output terminal and the low voltage side output terminal;

a fourth transistor provided between the third transistor and the low voltage side output terminal and having a different channel type from that of the third transistor; and a second connection portion which couples drain terminals of the third transistor and the fourth transistor and to which a voltage corresponding to the alternating current electric power inputted to the second input terminal is applied.

18. The electric power source circuit according to claim 17, wherein the first capacitor and the second capacitor are not directly coupled to the second connection portion.

19. The electric power source circuit according to claim 17, wherein the rectifying circuit further has:

a third bias unit which biases an alternating current voltage component of the alternating current electric power inputted to the first input terminal according to the magnitude of the amplitude of the alternating current voltage component and inputs the alternating current voltage component, which has been biased, to a gate terminal of the third transistor; and a fourth bias unit which biases the alternating current voltage component of the alternating current electric power inputted to the first input terminal according to the magnitude of the amplitude of the alternating current voltage component and inputs the alternating current voltage component, which has been biased, to a gate terminal of the fourth transistor.

\* \* \* \* \*